United States Patent [19]

Flores et al.

[11] Patent Number: 4,583,278

[45] Date of Patent: Apr. 22, 1986

[54] FENCE BUILDING AID AND METHOD

[76] Inventors: Jose O. Flores; Amalio G. Flores, both of Grand Prairie, Tex.

[21] Appl. No.: 686,277

[22] Filed: Dec. 26, 1984

[51] Int. Cl.[4] .......... B23Q 3/00; B25B 27/14; G01B 3/00; G01B 3/14

[52] U.S. Cl. .......... 29/467; 29/281.5; 29/281.6; 33/180 R

[58] Field of Search .......... 29/407, 281.5, 281.6, 29/464, 467, 559, 700, 720; 33/180 R, 563; 256/19, 22

[56] References Cited

U.S. PATENT DOCUMENTS

| | | | |
|---|---|---|---|
| 2,466,919 | 4/1949 | Sykes | 33/180 R |
| 2,991,857 | 7/1961 | Soderberg | 33/180 R X |
| 3,159,394 | 12/1964 | Burns | 33/180 R X |
| 3,368,286 | 2/1968 | Zenke | 33/180 R |
| 3,837,060 | 9/1974 | Stehling | 29/281.6 X |
| 3,888,477 | 6/1975 | Tate | 33/180 R X |
| 3,982,867 | 9/1976 | Pruett | 33/180 R X |
| 4,146,954 | 4/1979 | Day | 29/467 |

*Primary Examiner*—Howard N. Goldberg
*Assistant Examiner*—Ronald S. Wallace
*Attorney, Agent, or Firm*—Peter J. Murphy

[57] ABSTRACT

A guide for aligning pickets during the building of a picket fence includes a beam having a lower straightedge against which the tops of the pickets may be abutted during installation. The beam has a length approximately that of the typical distance between adjacent fence posts. The "picket end" of the beam is supported on the top of the last placed picket, with the beam face resting on the picket top, and front and rear legs at the picket end straddle the placed picket and the top rail and are spaced apart a distance equivalent to the thickness of the rail and picket to stabilize that end in the proper supported position. At the "rail end" of the beam, stabilizing legs are spaced apart a distance equivalent to the thickness of the rail; and a spacer block adjustably mounted between these legs rests on the top rail and establishes the rise of the beam at this rail end of the guide. Also, a method for aligning the pickets includes: securing one picket with the desired rise, supporting a straightedge beam on that one picket at one end and on the top rail at the other end, stabilizing the beam at the picket end by means of downwardly extending legs spaced apart a distance to straddle closely the top rail and picket, supporting the beam at the other end by means of a pair of legs which straddle closely the top rail and by means of a support block supported adjustably between those legs to establish the rise between the top rail and the beam at that rail end.

17 Claims, 10 Drawing Figures

FENCE BUILDING AID AND METHOD

BACKGROUND AND SUMMARY OF THE INVENTION

This invention relates to the building of picket fences, and more particularly to the aligning of the picket tops during the building of such fences.

Property owners who wish to have a picket fence on their property, are desirous that the tops of the pickets are aligned in perfectly straight lines, between selected points along the fence at least, in order to present a neat and pleasing appearance. In order to aid the fence builder to achieve that end, and at the same time to minimize the cost of achieving that end, it is desirable that the builder have some form of reliable guide and method.

One method is to secure a taut string between suitable points along the fence as the pickets are installed. This involves the careful mounting of supports for the string in a manner to position the string in the plane of the pickets, in a manner to position the string the correct distance above the top rail, and in a manner to assure that the string will remain taut. One disadvantage is that, on a windy day, the string may be off line and may stretch and sag. Another disadvantage is that great care must be exercised by the builder in positioning the pickets, so that the string is not displaced by any one picket. This system then is unreliable, is difficult to work with, and requires additional time for the correct placing of the pickets.

It would be desirable to have a method, including the use of a good fixture, wherein the fixture may be simply placed on the fence and be self-supporting, wherein the pickets may be abutted against the fixture without concern for displacing the alignment guide or line, and wherein the fixture may be readily adjusted, and adapted for different rises of the pickets above the top rail of the fence.

A principal object of this invention is to provide a simple and effective means for aligning the tops of fence pickets in a straight line, during the building of a fence.

Another object of this invention is to provide such means which may be quickly and easily adjusted or changed to accommodate a different selected rise of the pickets above the top rail of the fence.

These objects are accomplished in a guide for securing pickets to the rails of a picket fence on which the pickets are secured to the rails with a selected rise above the top rail. The guide includes a beam having a straightedge lower face against which the tops of the pickets are to be aligned. The guide includes downwardly, extending legs at one end of the beam spaced to straddle and enclose the thickness of the fence top rail and a picket secured thereto, so that that end of the beam will rest on the top of the picket, and downwardly extending legs secured to the beam at the other end and spaced to straddle and enclose the thickness of the top rail. At this other end, a support block mounted between the legs has a support surface spaced from the beam face the distance of the selected picket rise.

These objects are also accomplished in a method for aligning the pickets of a picket fence which includes the following steps. One picket is secured to the rails of the fence with the picket top having a selected rise. A straightedge beam is supported over the fence top rail, having a lower beam face to be abutted by the tops of the pickets to be secured to the rails. One end of the beam is supported on the top of the secured picket. The other end of the beam is supported on the fence top rail by means of a support member mounted on the beam and spaced from the beam face a distance equivalent to the selected rise of the pickets.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
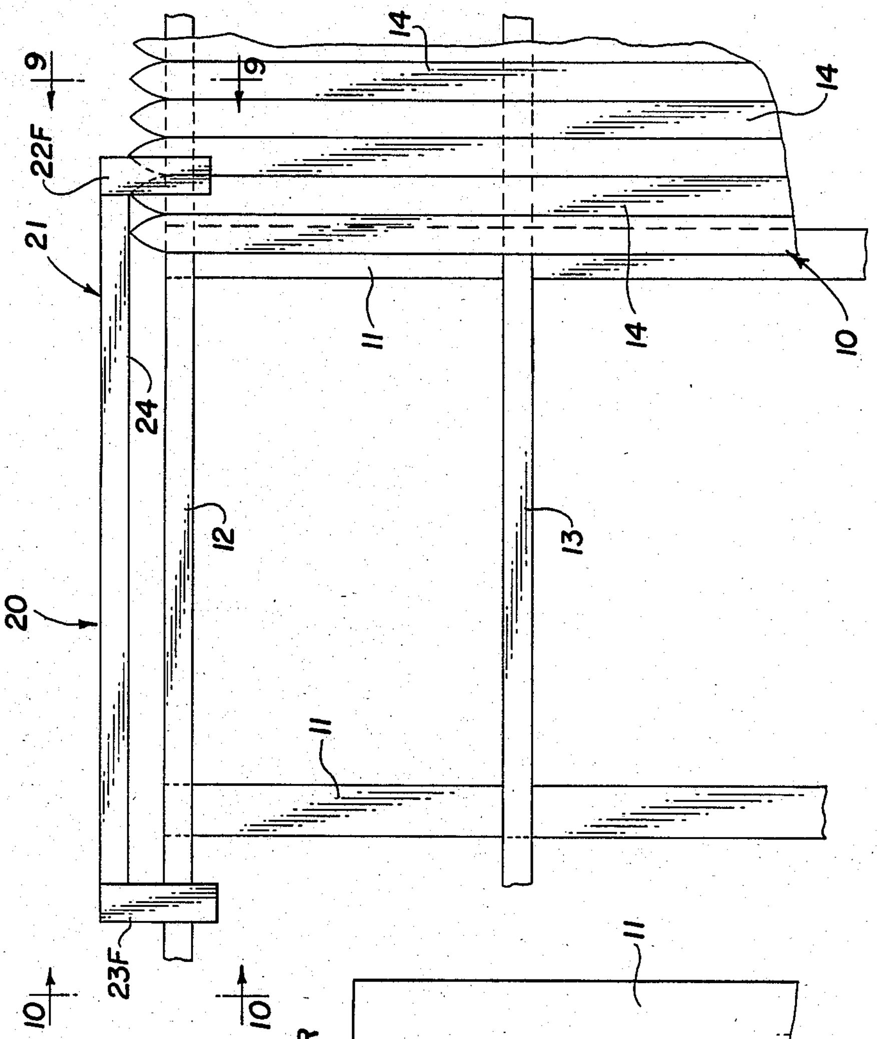
FIG. 1 is a fragmentary elevation view of a picket fence, with a fence building guide according to the invention supported on the fence.

FIG. 1 of the drawing is a front view of one form of a typical picket fence 10 which consists of vertical posts 11, transverse or generally horizontal rails 12 and 13, and vertical slats or pickets 14. The posts 11 may be fabricated from any suitable material; and in the illustrated example may be fabricated from 5"×5" or 6"×6" wood posts. For a fence five to eight feet high for example the pickets 11 would be secured to three rails: a top rail 22, a middle rail 23 and a bottom rail not shown. These rails may be fabricated for example from 2"×3" wood boards appropriately secured to the posts 11. The top rail 12 would be secured to the posts at the desired elevation relative to the terrain to establish the top line of the fence; and the posts 11, in the illustrated example would then be cut off flush with the top of the top rail 12.

The illustrated pickets 14 may be fabricated from 1"×4" wood boards for example having pointed tops. In the illustrated example, the pointed tops may have a rise or elevation of four inches for example from the base of the pointed tops to the tips; and in the securing of the pickets to the rails, at least a four inch rise is then desired so that the top rail will not be seen between the picket tips. Alternatively, the tip design or configuration may be different, requiring a higher rise; or the fence builder or owner may desire a higher rise of the picket tips from the top rail for some other functional or appearance purpose for example. In the building of the fence, it is important that the tips of the pickets have the appropriate rise from the top rail, or more precisely from the line of the top rail assuming that the top rail is perfectly straight with no vertical bow.

A guide or building aid 20 for achieving this is illustrated in elevation in FIG. 1, and in further detail in FIGS. 2 through 8. This guide consists essentially of an elongated beam 21, a pair of downwardly extending legs and at one end which will be referred to as the picket end, and a pair of downwardly extending legs 23F and 23R at the other end which will be referred to as the rail end. The picket end is so designated because that end rests on the fence pickets 14 as will be described; and by the same token the rail end is so designated because it is supported on the top rail 12 as will be described. As best seen in FIG. 1, the length of the guide 20 is preferably selected to correspond to the typical distance between fence posts 11, in order to establish a straight fence line between posts as will be described. The guide is illustrated in FIG. 1 as slightly longer than that distance, so that the guide may span adjacent fence posts without interference from the post tops.

In the form illustrated in the drawing, the beam 21 is a laminated structure consisting of a center beam 21A, a front member 21B and a rear member 21C. This form is illustrated only by way of example; and the beam may have any desired configuration and be fabricated from any desired material. The illustrated laminated beam may be fabricated from wood boards, with the main beam 21A being fabricated from a length of 2"×3" fence rail, with the front and rear members being fabricated from 1" board stock. The front member may be fabricated from picket stock for example since the thickness of the front member should desirably be the same thickness as the pickets. By the same token, in the illustrated configuration, the thickness of the base beam 21A should be the same thickness as the top rail 12.

Figure 3:
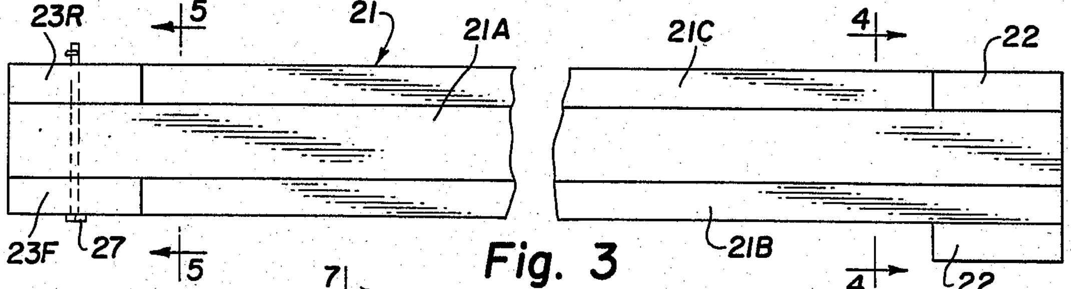
FIG. 3 is a top view of the building guide of FIG. 1.

The above mentioned pairs of legs consist of respective front and rear legs; and these may be fabricated from lengths of 1×4 board stock for example. As best seen in FIG. 3, the rear legs 22R and 23R are secured to the beam in the same plane as the rear beam member 21C; and the front leg 23F is secured to the beam in the same plane as the front beam member 21B. The space between the rail end legs 23F and 23R is then the same as the thickness of the main beam 21A and the thickness of the top rail 12. The front leg 22F at the picket end of the guide is secured to the beam front member 21B; and it will be seen that the distance between the legs 22F and 22R at the picket end is the same as the thickness of the base beam 21A and the front face 21B, which is the same as the combined thickness of the top rail 12 and a picket 14. All of the legs extend downwardly from the beam lower face 24 a distance sufficient that the legs will accommodate the rise of the fence pickets and also overlap the side faces of the top rail 12. These legs might have a downward extension of seven to nine inches for example. The lower face 24 of the beam 21, particularly the lower member of the beam front face 21A must be perfectly linear since it functions as a straight edge against which the pickets are to be abutted, as will be described.

The illustrated guide 20 is designed for use in constructing a fence wherein the pickets are secured to the rails beginning at the right hand end of the fence span and moving toward the left. When the guide is placed for the next span between adjacent posts 11, the right hand or picket end of the guide rests on the top of the already secured pickets 14, possibly the last picket so secured, and the left hand or rail end rests on the rail 12. In order to support the rail end at the desired elevation or rise from the rail, a support block 25 is secured between the legs 23F and 23R. The support block is mounted to have a lower support face 26 which actually rests on the rail; and the block is preferably mounted in a manner to be adjusted so that the support face 26 may be spaced a desired distance from the lower beam face 24.

Figure 10:
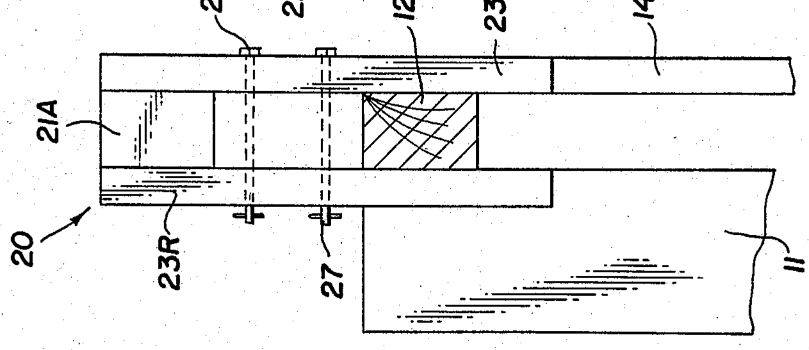
FIG. 10 is a fragmentary sectional view taken along the line 10—10 of FIG. 1, and a view of the end of the building guide opposite from that of FIG. 9.
Figure 2:
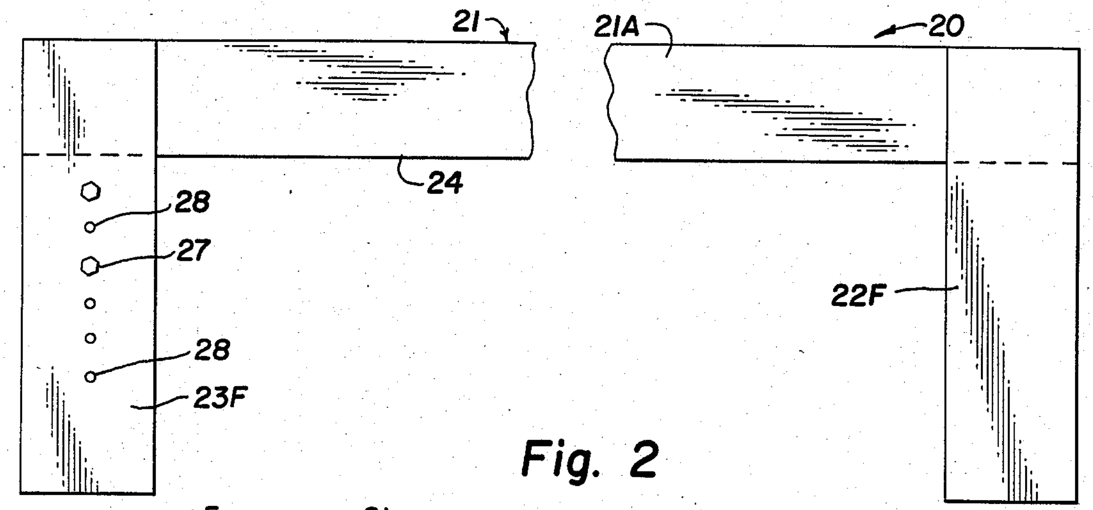
FIG. 2 is an enlarged elevation view of the building guide of FIG. 1, partially broken away.
Figure 5:
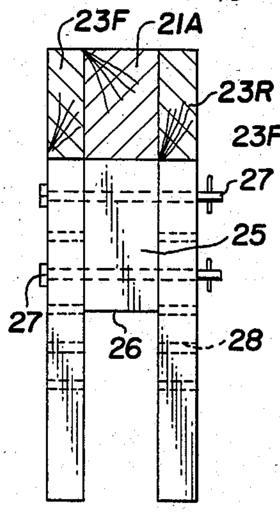
FIG. 5 is a view of the other end of the building guide, partially in section as viewed along the line 5—5 of FIG. 2.
Figure 6:
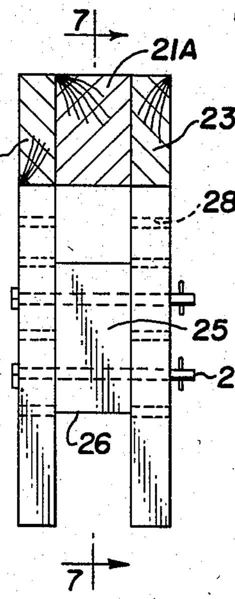
FIG. 6 is a view similar to that of FIG. 5, showing an alternative position of the support block.
Figure 7:
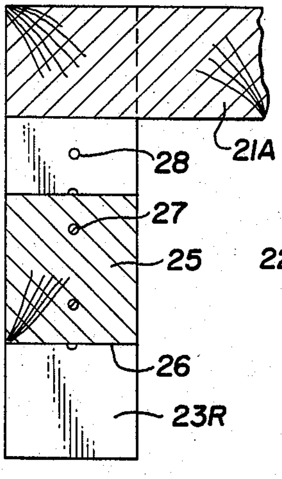
FIG. 7 is a fragmentary sectional view taken along the line 7—7 of FIG. 6.
Figure 4:
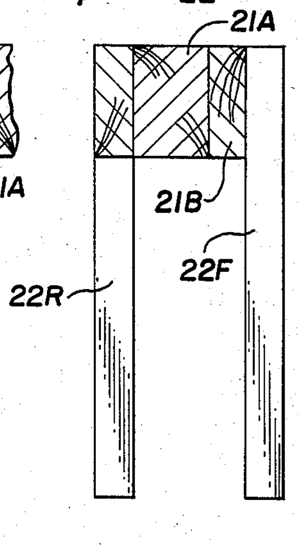
FIG. 4 is a view of one end of the building guide, partially in section as viewed along the line 4—4 of FIG. 2.
Figure 8:
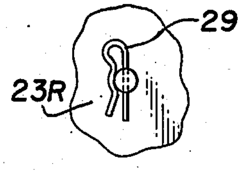
FIG. 8 is a fragmentary sectional view illustrating a retaining clip for a supporting pin for the support block illustrated in FIGS. 5, 6 and 7.

As best seen in FIGS. 5, 6 and 7, the support block 25 may have a depth of about four inches for example; based on the assumption that the minimum rise to be encountered in fence building would be four inches. As seen in FIGS. 5 and 10 then, the block 25 is positioned for a four inch rise, that is to support the beam 21 four inches above the top rail 12. By way of example, the block 25 may be supported by a pair of pins 27 passing through parallel bores in the block which are spaced two inches apart and passing through selected ones of aligned holes 28 in the front and rear legs 23F and 23R. In FIGS. 6 and 7, the block 25 is shown in an alternative position wherein the rise of the fence pickets would be six inches for example. The block supporting pins 27 may be retained by suitable retaining clips 29, as best seen in FIG. 8.

Figure 9:
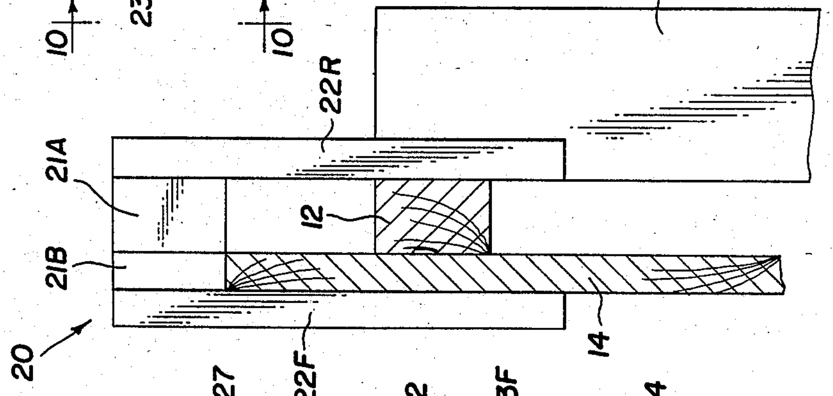
FIG. 9 is a fragmentary sectional view of the fence taken along the line 9—9 of FIG. 1, and an end view of the building guide.

The use of the guide 20 according to the invention is illustrated in FIGS. 1, 9 and 10. When at least one picket 14 has been secured to the fence rails with the desired rise from the top rail 12, and the guide support block is positioned for the desired rise, the guide is placed as illustrated in FIG. 1 with the picket end resting on the tip of that picket, and the rail end resting on the top rail 12. The beam face 24 then is essentially parallel to the rail 12 and defines a straight edge against which the succeeding pickets will be abutted. As seen from the picket end in FIG. 9, the legs 22F and 22R snugly enclose the top rail 12 and picket 14 so that the guide 20 is quite rigidly supported; and it will be seen that the beam front member 21B is aligned in the plane of the pickets. As viewed from the rail end in FIG. 10, the span of the legs 23F and 23R is only that of the top rail 22 so that this end of the guide is also relatively securely supported on the rail 12, and maintained at the desired rise by the support block 25. At this rail end the front leg 23F is maintained in the plane of the pickets so that the front beam member 21B is maintained in that plane throughout the length of the guide. For the securing of additional pickets then, the tips of the pickets are simply abutted against that beam face 24 and, because of the manner of guide support and of its weight, these pickets may be placed quickly without disturbing the picket line established by the beam face 24.

METHOD

The above described guide may be used in the practice of a method for building a picket fence which includes the following steps. A picket is secured to the rails of the fence, with the top of the picket having a selected rise above the top rail of the fence. That picket is secured to the rails at or near one of the posts of the fence. A straightedge beam is supported over the top rail, that beam having a lower face to be abutted by the tips of the pickets to be secured to the rails. One end of the beam is supported on the top of the already secured picket, to establish the rise of the beam at that one end, and that one end is further supported on the top of the picket by means of a pair of downwardly extending legs which are spaced to straddle the top rail on the picket. That one end of the beam may be further supported and stabilized by spacing the legs apart a distance to straddle closely the top rail and picket. The other end of the beam is supported on the top rail of the fence by means of a support means having a support face spaced from the beam face a distance corresponding to the rise of the fence picket. That other end is further supported by means of downwardly extending legs spaced apart to straddle that top rail. That other end is further supported and stabilized on the fence by those downwardly extending legs which are spaced apart to straddle closely that top rail. That other end is supported on the top rail with the desired rise by means of that support block which is adjustably mounted between the respective legs at that end. The beam is preferably fabricated to a length approximately equivalent to a typical distance between adjacent posts of a fence.

What has been described is a unique guide and unique method for aligning the tops of pickets during the building of a picket fence.

A feature and advantage of the invention is that the guide is simple in design and very easy to use, thereby minimizing the time establish the line for the tops of the pickets between adjacent posts and minimizing the time for aligning the pickets along that line during the securing of the pickets to the fence rails.

A related feature of the invention is that the guide is sufficiently rugged and massive that the pickets may actually abut it against the guide to establish the alignment, without danger of disturbing that guide line.

A related feature and advantage of the invention is the provision of a method for aligning pickets on a fence which minimizes both the set up and installation time, thereby enabling the builder to construct a perfectly aligned fence in less time and with resultant reduced costs to the property owner.

Another feature of the guide is that it may be readily adjusted to accommodate a selected rise for the pickets above the top rail; and the guide may be designed then for use in building fences having a relatively wide range of selected rises for those pickets.

While preferred embodiments of the invention have been illustrated and described, it will be understood by those skilled in the art that changes and modifications may be resorted to without departing from the spirit and the scope of the invention.

What is claimed is:

1. A guide for the securing of pickets to the rails of a picket fence, on which the pickets are secured to said rails with a selected rise above the fence top rail; said guide comprising a straight edge beam having a lower beam face against which the tops of the fence pickets are to be abutted;

a pair of downwardly extending legs secured to said beam at one end thereof, spaced to straddle and enclose the thickness of the fence top rail and a picket secured thereto whereby said one end of said beam face will rest on the top of a secured picket;

a pair of downwardly extending legs secured to said beam at the other end thereof, spaced to straddle and enclose the thickness of said fence top rail;

a support block mounted between said legs at said other end of said beam; said support block having a downward facing support face spaced from said beam face the distance of said selected picket rise, and adapted to support said other beam end on the top of said fence top rail.

2. A guide as set forth in claim 1 including said beam having a length approximately the same as the typical distance between the posts of said fence.

3. A beam as set forth in claim 1 including said beam having a length slightly larger than the typical distance between the posts of said fence.

4. A guide as set forth in claim 1 including means for mounting said support block between said legs at different selected positions to locate said support face at different selected distances from said beam face.

5. A guide as set forth in claim 1 including said legs at said one end of said beam extending parallel to each other, and being spaced apart a distance equivalent to the thickness of said fence top rail and said secured picket, whereby said beam will rest securely over said picket.

6. A guide as set forth in claim 5 including said legs extending from said beam face a distance sufficient to overlie the sides of said top rail.

7. A guide as set forth in claim 1 including said legs at said other end of said beam extending parallel to each other and being spaced apart a distance equivalent to the thickness of said top rail, whereby said other end of said beam will rest securely on said top rail.

8. A guide as set forth in claim 7 including said legs extending from said beam face a distance sufficient to overlie the sides of said top rail.

9. A guide as set forth in claim 1 including said beam comprising a laminate structure including a main beam fabricated from a length of said rail, a front beam member fabricated from material having the same thickness as a fence picket, and a rear beam member having the same thickness as a fence picket;

said front beam member providing said beam face to be abutted by the tops of the fence pickets;

said pairs of legs mounted at said one end and said other end of said beam including respective rear legs mounted in the plane of said rear beam member; said pair of legs at said one end of said beam including a front leg mounted on the face of said front beam member; and said pair of legs at said other end of said beam including a front leg mounted in the plane of said front beam member.

10. A method for aligning the pickets of a picket fence consisting of vertical posts, generally horizontal rails, and generally vertical pickets, comprising the steps securing a picket to the rails of said fence, with the top of said picket having a selected rise above the top rail of said fence;

supporting a straightedge beam over said top rail, having a lower beam face to be abutted by the tops of the fence pickets to be secured;

supporting one end of said beam on the top of said one picket;

supporting the other end of said beam on the top of said fence top rail by means of a support member spaced from said beam face a distance corresponding to said picket rise;

and abutting the tops of successive pickets against said beam face prior to securing said pickets to the rails of said fence.

11. A method as set forth in claim 10 including the step securing said picket to said rails adjacent to a post of said fence.

12. A method as set forth in claim 10 including the step fabricating said beam to a length approximately equivalent to a typical distance between posts of said fence.

13. A method as set forth in claim 10 including the step supporting said one end of said beam on said one picket by means of a pair of downwardly extending legs spaced to straddle said top rail and said picket.

14. A method as set forth in claim 13 including the step spacing said legs apart a distance to straddle closely said top rail and said picket.

15. A method as set forth in claim 10 including the step supporting the other end of said beam on said top rail by means of a pair of downwardly extending legs spaced to straddle said top rail.

16. A method as set forth in claim 15 including the step spacing said legs apart to straddle closely said top rail.

17. A method as set forth in claim 15 including the step further supporting said other end of said beam on said top rail by means of an adjustable support member mounted between said legs.

* * * * *